United States Patent [19]

Makino et al.

[11] 4,282,302

[45] Aug. 4, 1981

[54] FERRITE POWDER TYPE MAGNETIC TONER USED IN ELECTROPHOTOGRAPHY AND PROCESS FOR PRODUCING THE SAME

[75] Inventors: Motohiko Makino; Kenji Imamura; Yoshinori Kurosawa, all of Tokyo, Japan

[73] Assignee: TDK Electronics, Ltd., Tokyo, Japan

[21] Appl. No.: 87,044

[22] Filed: Oct. 22, 1979

[30] Foreign Application Priority Data

Oct. 27, 1978 [JP] Japan ................................ 53/132368

[51] Int. Cl.³ ........................ G03G 9/00; C04B 35/04; C01G 49/08; C04B 35/26

[52] U.S. Cl. .................................... 430/107; 430/109; 430/111; 430/137; 430/903; 430/904; 252/62.54; 252/62.56; 252/62.6; 252/62.62; 252/62.64

[58] Field of Search ............... 430/107, 111, 137, 109, 430/903, 904; 252/62.51, 62.53, 62.54, 62.56, 62.6, 62.62, 62.63, 62.64

[56] References Cited

U.S. PATENT DOCUMENTS

| | | | |
|---|---|---|---|
| 3,563,734 | 2/1971 | Shely | 96/1.4 |
| 3,639,245 | 2/1972 | Nelson | 252/62.1 |
| 3,764,313 | 10/1973 | Shely | 96/1.5 |
| 3,839,029 | 10/1974 | Berg | 430/107 |
| 3,914,181 | 10/1975 | Berg | 430/111 |
| 4,097,392 | 6/1978 | Goldman | 252/62.62 |

FOREIGN PATENT DOCUMENTS 1456993 3/1966 France .

OTHER PUBLICATIONS

P. M. Cassiers and J. Van Engeland, Photographic Science & Engineering, vol. 9, No. 4, Jul.-Aug. 1965, pp. 273-279.

Kirk-Othmer Encyclopedia of Chemical Technology, Third Edition, vol. 8, 1979, pp. 812, 813, 823, 825; vol. 9, 1980, pp. 889-902.

L. B. Schein, Electrophotography, Second International Conference, Society of Photographic Scientists and Engineers, Washington, D.C., 1974, pp. 65-73.

L. B. Schein, Photographic Science & Engineering, vol. 19, No. 5, Sep./Oct. 1975, pp. 255-265

*Primary Examiner*—Mary F. Downey

*Attorney, Agent, or Firm*—Oblon, Fisher, Spivak, McClelland & Maier

[57] ABSTRACT

A ferrite powder type magnetic toner used in an electrophotography. It comprises a resinous component and a ferrite having a spinel structure comprising components of iron oxide at a ratio of 99.9 to 51 mole % as $Fe_2O_3$ and at least one metal oxide selected from the group consisting of manganese oxide, nickel oxide, cobalt oxide, magnesium oxide, copper oxide, zinc oxide and cadmium oxide at a ratio of 0.1 to 49 mole % as MO wherein M represents Ni, Co, Mg, Cu, Zn or Cd.

7 Claims, No Drawings

FERRITE POWDER TYPE MAGNETIC TONER USED IN ELECTROPHOTOGRAPHY AND PROCESS FOR PRODUCING THE SAME

BACKGROUND OF THE INVENTION

1. Field of the Invention

The present invention relates to a ferrite powder type magnetic toner used in electrophotography and a process for producing the ferrite powder.

2. Description of the Prior Arts:

Various methods have been known as a development system in an electrophotography. Two component system for transferring a toner made of a mixture of carbon and a resinous component through a magnetic brush made of an iron powder carrier on an electrophotosensitive substrate has been mainly employed.

Thus, one component system for using a toner having magnetic property which contains a magnetic powder instead of carbon without a carrier has been developed and employed in a commercial scale.

In the one component system, an operation of a development is easily carried out and accordingly, no control is required and an exchange of a carrier is not required and only additional feeding of the toner is required. Moreover, a development unit is simple whereby a labour required for a maintenance is highly reduced and an apparatus is simplified to result light weight and low cost.

In usual, the magnetic powder for the magnetic toner used in the one component system should have the following characteristics.

(i) It is necessary to have a high magnetic flux density in a magnetic field of about 1000 Oe. For example, in an external magnetic field of 1000 Oe, it is necessary to have a maximum magnetizing force that is, magnetization, $\sigma m$ of higher than 40 emu/g. so that a height of the magnetic brush is enough high.

(ii) It is necessary to have a high coercive force together with the requirement (i). For example, in an external magnetic field of 1000 Oe, it is necessary to have a coercive force Hc of about 150 to 500 Oe so that desired characteristics for transfer property, fluidity and coercive force of the toner are given. Thus, it is necessary to have $\sigma m \times Hc$ of more than about $6 \times 10^3$ as B-H product.

(iii) It is necessary to have suitable electric resistivity preferably $10^2$ to $10^7$ Ω.cm as an electric resistivity of the magnetic powder.

(iv) It is necessary to have black color which can be practical used. A coloring agent can be incorporated in the magnetic toner. However, it is preferable not to incorporate a coloring agent by using a magnetic powder having black color.

(v) It is necessary to have high heat resistance and to have stable hue especially black color and stable electromagnetic characteristics in a range of about 0° to 150° C.

(vi) It is necessary to have less hygroscopic property and high moisture resistance since electrostatic characteristics of the toner are disadvantageously varied when the hygroscopic property is high.

(vii) It is necessary to have high compatibility of the magnetic powder to the resin. In usual, the toner has a diameter of less than several tens $\mu$ and accordingly, micro-compatibility in the toner is important factor. Thus, it is necessary to use the magnetic powder having a diameter of less than $1\mu$ and a sharp particle size distribution and uniform particle size among many lots in its production.

(viii) It is necessary to prevent serious deterioration of electrostatic characteristics of the resin, deterioration of the resin and periodical change of the properties.

On the other hand, it has been proposed to use ferromagnetic alloys such as magnetites and ferrites and alloys which have not ferromagnetic property but impart ferromagnetic property by a heat-treatment such as Mn-Cu-Al alloy and chromium dioxide etc. as a magnetic powder for magnetic toner in Japanese Unexamined Patent Publication No. 45639/1975.

Thus, the magnetic powder should be pulverized in a form of fine powder when it is used for a magnetic toner. These alloys are unstable in the pulverization and the cost thereof is expensive. On the other hand, chromium dioxide has toxicity. Thus they may not be practically used. It has been proposed to use ferrite in a toner in patents and other prior arts. However, these proposals are only suggestions. Any ferrite having specific components and formula has not been practically used for a magnetic toner.

It has been proposed to use in a toner, a magnetite as iron black used for a pigment which is obtained as a precipitate in a reaction of an aqueous solution (hereinafter referring to as magnetite obtained by an aqueous solution process) in patents and other prior arts. The magnetite has been practically used. The magnetite has satisfactory electric and magnetic characteristics required in the items (i) to (iii) and satisfactory hue in the item (iv). However, it is difficult to control the electric and magnetic characteristics required in the items (i) to (iii) in satisfactory uniform accuracy in the production of the magnetite. These characteristics may be varied in each batch in the production. The heat resistance, the moisture resistance and the compatibility to the resin and the adverse effect to the resin required in the items (v) to (viii) are not satisfactory and may be varied in each batch in the production. These disadvantages are found. It is difficult to satisfy these requirements of the characteristics by the magnetite obtained by the aqueous solution process, because there are many fluctural factors for each lot so as to highly vary the electric and magnetic characteristics, the heat resistance, the moisture resistance, the particle diameter, the particle size distribution and the impurity content.

When the magnetite is used for the toner, various problems are caused in the use of the toner and a trouble is caused in a copying process because of said disadvantages.

In the production of the magnetite obtained by the aqueous solution process, a large amount of a base is used whereby a washing is not easy and a labour is required for a treatment of a waste solution after the washing to increase a cost for the production. These are disadvantages in the production.

It has been studied on maghemite producted by a similar process to that of the magnetite or modified maghemite obtained by incorporating cobalt so as to vary the magnetic characteristics. Thus, these ones have also similar disadvantages to those of the magnetite.

SUMMARY OF THE INVENTION

It is an object of the present invention to overcome disadvantages of the conventional magnetic powders for magnetic toner used in an electrophotography and to provide a magnetic powder type magnetic toner which has excellent characteristics required in the items (i) to (viii).

It is another object of the present invention to provide a process for producing the magnetic powder for magnetic toner having excellent characteristics in high efficiency by a stable operation.

The foregoing and other objects of the present invention have been attained by providing a ferrite powder type magnetic toner used in an electrophotography which comprises a resinous component and a ferrite having a spinel structure comprising components of iron oxide at a ratio of 99.9 to 51 mole % as $Fe_2O_3$ and at least one metal oxide selected from the group consisting of manganese oxide, nickel oxide, cobalt oxide, magnesium oxide, copper oxide, zinc oxide and cadmium oxide at a ratio of 0.1 to 49 mole% as MO wherein M represents Ni, Co, Mg, Cu, Zn or Cd.

DETAILED DESCRIPTION OF THE PREFERRED EMBODIMENTS

The inventors have studied on various matters for said purposes and have found that excess iron component type ferrite having spinel structure which has specific components and formula can be used as the magnetic powder for magnetic toner having excellent characteristics for said purposes. The present invention has been attained by the finding.

The ferrite powders type magnetic powder of the present invention will be further illustrated.

The ferrite powder for magnetic toner of the present invention is an excess iron component type ferrite powder having spinel structure which comprises components of iron oxide a ratio of 99.9 to 51 mole % as $Fe_2O_3$ and at least one metal oxide selected from the group consisting of manganese oxide, nickel oxide, cobalt oxide, magnesium oxide, copper oxide, zinc oxide, and cadmium oxide at a ratio of 0.1 to 49 mole % as MO wherein M represents Ni, Co, Mg, Cu, Zn or Cd. The formula of said ferrite having the spinel structure is substantially the same as the stoichometric formula $$(M'O)_x(FeO)_{1-x}Fe_2O_3$$

wherein x is in a range of 0.002 to 0.980 and M'O represents one to six kinds of said MO as one mole. The formula is not substantially different from the stoichometric formula.

The ferrite powder of the present invention can include less than 1.0 wt.% of impurities such as $Al_2O_3$, $Ga_2O_3$, $Cr_2O_3$, $V_2O_5$, $GeO_2$, $SbO_2$, $TiO_2$, etc.

The ferrite powder can contain also a surface modifier added in the production if desired.

The ferrite powder of the present invention has an average particle diameter of less than about 1μ and preferably in a range of about 0.20 to 0.80μ and preferably has sharp particle size distribution.

The ferrite powder of the present invention has satisfactory characteristics of the magnetic powder for magnetic toner required in the items (i) to (viii) and has superior characteristics to those of the conventional ones in total characteristics. That is, the ferrite powder has high maximum magnetizing force $\sigma m$, high coercive force Hc, high B-H product, and satisfactory electric resistivity of $10^5$ to $10^7$ Ω.cm. These electric and magnetic characteristics are not varied for each lot in the production as those of the magnetite obtained by the aqueous solution process. The characteristics of the ferrite powder can be controlled in high accuracy in the production. Moreover, lightness which corresponds to reflectivity in low as the hue and differences of reflectivities at different wavelengths of the spectrum are small and the ferrite powder has black or similar color and can be used for the preparation of the magnetic toner without using a coloring agent or with only a small amount of a coloring agent. Therefore, the characteristics required in the items (i) to (iv) are satisfactorily give. Moreover, the ferrite powder of the present invention has significant characteristics that the characteristics in the items (v) to (viii) are remarkably superior to those of the conventional magnetic powder.

With regard to the heat resistance of the item (v), the ferrite powder of the present invention is stable by heating at higher than about 180° C. so that the electric and magnetic characteristics and the hue are not substantially varied. Thus, it is suitable as a magnetic powder for a magnetic toner.

The deteriorations of the electric and magnetic characteristics and the hue of the ferrite powder of the present invention after the heating at lower than about 180° C., are remarkably lower in levels of from 1/several time to 1/several tens time of those of the magnetite obtained by the conventional aqueous solution process. In usual, when an average particle size of a magnetic powder is increased and a specific surface area is decreased, the activity of the magnetic powder is decreased but the heat resistance is improved. It may be possible to give high heat resistance to the magnetite obtained by the conventional aqueous solution process as that of the ferrite powder if the average particle diameter is more than several times of the average particle diameter of the ferrite powder. However, the particle size of such magnetite is too large to use it in a practical use in view of serious inferiorities of the compatibility with a resinous component, the affinity and the moisture resistance. From the above-mentioned viewpoints, the heat resistance of the ferrite powder of the present invention is remarkably superior to that of the conventional magnetic powder and the fluctuation of the heat resistance in different lots is small.

With regard to the moisture resistance in the item (vi), an adsorption of water and an adsorption speed of the ferrite powder of the present invention are remarkably less than those of the conventional magnetic powder especially magnetite. Therefore, the ferrite powder is advantageously used for a magnetic toner.

With regard to the hygroscopic property, the fluctuation of the hygroscopic property in different lots is less.

The compatibility of the ferrite powder with the resinous component in the item (vii) is remarkably superior, because the average particle diameter of the ferrite is less than 1μ and the particle size distribution is not broad, and they can be easily and precisely controlled.

As the magnetic toner, it is necessary to have high affinity between the resinous component and the magnetic powder. The ferrite powder of the present invention has stable surface condition and accordingly, it has high affinity to the resinous component and the affinity is constant. Therefore, the ferrite powder does not advantageously affect to the electrostatic characteristics of the resinous component on the item (viii). Thus, an addition of a surface modifier required for the conventional magnetic powder is not required or can be small.

With regard to the adverse effect to the resinous component in the item (viii), the ferrite powder of the present invention has stable neutral property so that no adverse effect is given. Therefore, the ferrite powder has not disadvantages as the magnetite obtained by the conventional aqueous solution process which contains an alkaline component remained in the production which causes adverse effects to the resinous component or which requires the labour work for washing out the alkaline component to cause high cost or which causes the fluctuation of a content of the alkaline component whereby the electrostatic characteristics of the magnetic toner are varied.

As described, the ferrite powder of the present invention has remarkably superior functions to those of the conventional magnetic powder in total.

The ferrite powder of the present invention preferably comprises the component of at least one of CoO, MnO, ZnO, and NiO as M'O if necessary, comprising further one or more of CuO, MgO and CdO.

The ferrite powder preferably comprises the iron oxide component at a ratio of 55 to 99 mole % as $Fe_2O_3$ especially 60 to 90 mole % as $Fe_2O_3$ and a residual component at a ratio of 45 to 1 mole % as M'O especially 40 to 10 mole % as M'0.

In the stoichiometric composition M'O is preferably one component system of ZnO, CoO, NiO, MgO or MnO; two component system of ZnO—CoO, MnO—CoO, NiO—ZnO, NiO—CoO, MgO—ZnO, CoO—MgO or MnO—ZnO; three component system of CoO—MnO—ZnO, NiO—CoO—ZnO, NiO—ZnO—CuO, MnO—ZnO—CuO or CoO—ZnO—MgO; or four component system of CoO—MnO—ZnO—NiO. The desired effect is given by said systems.

The ferrite powders have superior magnetic characteristics of the maximum magnetizing force $\sigma m$, the coercive force $H_c$ and the B-H product and also flat reflactive spectrum of the powder. Thus, it is unnecessary to incorporate a coloring agent though an incorporation of a coloring agent is not prevented.

The optimum ferrite powders have the formula I to IV which is shown by a molar ratio of the iron oxide component as $Fe_2O_3$ to the oxide component as MO.

$$(M^{(1)}O)_a(Fe_2O_3)_{1-a} \quad \text{I.}$$

wherein $M^{(1)}$ represents Mn, Zn, Ni or Co especially, Mn, Zn or Ni; and a is in a range of 0.01 to 0.4 preferably 0.1 to 0.3.

$$(M^{(2)}O)_b(ZnO)_c(Fe_2O_3)_{1-b-c} \quad \text{II.}$$

wherein $M^{(2)}$ represents Mn, Ni, Co or Mg, especially Mn, Ni or Co; and b+c is in a range of 0.01 to 0.45 preferably 0.1 to 0.45; b is in a range of 0.005 to 0.445; c is in a range of 0.005 to 0.35 preferably 0.1 to 0.3.

$$(M^{(3)}O)_d(CoO)_e(Fe_2O_3)_{1-d-e} \quad \text{III.}$$

wherein $M^{(3)}$ represents Mn, Ni or Mg especially Mn or Ni; d+e is in a range of 0.01 to 0.45 preferably 0.1 to 0.45; d is in a range of 0.005 to 0.445; and e is in a range of 0.005 to 0.2.

$$(M^{(4)}O)_f(CoO)_g(ZnO)_h(Fe_2O_3)_{1-f-g-h} \quad \text{IV.}$$

wherein $M^{(4)}$ represents Mn, Ni or Mg preferably Mn or Ni especially Ni; f+g+h is in a range of 0.01 to 0.45 preferably 0.1 to 0.45; f is in a range of 0.003 to 0.443; g is in a range of 0.003 to 0.25; h is in a range of 0.004 to 0.4 preferably 0.05 to 0.3.

The ferrite powder of the present invention can be produced by the following process as one preferable embodiment.

In the first step of the production, the starting materials are mixed.

The starting materials can be $Fe_2O_3$ at a ratio of 99.9 to 51 mole % and one or more of MO(M is defined above) at a total ratio of 0.1 to 49 mole %.

It is possible to use one or more of Fe, FeO and $Fe_2O_3$ at a ratio of 99.9 to 51 mole % as $Fe_2O_3$ instead of $Fe_2O_3$ itself.

It is possible to use the other oxide of M or a compound which is convertible into MO by a heating such as carbonates, oxalateschlorides of M etc., instead of MO.

The starting materials at desired ratios are mixed. A wet mixing process is preferably employed, and can be the conventional wet mixing process.

In usual, the starting materials are mixed in a wet ball mill for several hours such as about 5 hours. The uniformity of the starting materials is improved by the wet mixing process to decrease causes for fluctuation of the structure and fluctuation of characteristics as the causes of deterioration of characteristics. Thus, the quality and stability of the magnetic powder are improved.

The product as a slurry is treated in a granulation step. The slurry can be concentrated and dried to have a water content of less than 10 wt.% before the granulation step, if desired. Then, the product can be calcined at lower than 1000° C. such as 800° to 1000° C. for 1 to 3 hours and then, pulverized to form particles having diameters of less than about 10$\mu$ if desired.

In the second step, the granulation is carried out to form granules having 20 to 30 mesh under (to pass through 20 to 30 mesh seive). The granulation can be carried out by passing the dried product through a seive or by spray-drying the slurry obtained by the wet mixing.

In the third step, the granules are sintered at a desired temperature of higher than 1000° C. The ferrite powder of the present invention is excess iron component type ferrite and accordingly, a partial pressure of oxygen in the sintering atmosphere is decreased as desired (usually less than 5 vol.% of oxygen content) in the sintering step. After the sintering, the sintered product is cooled. The cooling speed is preferably fast. When the cooling speed is relatively slow, the partial pressure of oxygen at the sintering is maintained or further decreased during the cooling it to near room temperature. Thus, the stoichiometric structure can be given. The optimum condition for the sintering is as follows.

The heating is started in air preferably at a heating speed of about 2° to 300° C./hour. When a furnace temperature is elevated to 800° to 900° C., the oxygen content in the atmosphere is decreased to less than 5 vol.% preferably less than 3 voi.%. In such atmosphere, the granules are sintered at lower than 1450° C. preferably 1300° to 1400° C. for 3 to 5 hours. Then, the sintered product is cooled at high cooling speed such as greater than 300° C./hour. At the start of the cooling, the partial pressure of oxygen is preferably less than 0.5 vol.%. The cooling can be continued in said partial pressure. Thus, the partial pressure of oxygen (oxygen content) in the atmosphere is preferably decreased to less than 0.1 vol.% when the furnace temperature is decreased to about 1100° C. so that a desired result is given. When the furnace temperature is decreased to lower than 100°

C., the sintered product is discharged to finish the sintering step.

In the fourth step, the sintered product is mechanically pulverized to obtain the ferrite powder of the present invention having an average particle diameter of 0.2 to 0.8μ. Various methods can be employed for the mechanical pulverization. The optimum method is as follows.

The sintered product is pulverized to form particles having an average diameter of less than 150 mesh under. The pulverization can be carried out by a vibration mill or an atomizer. When the sintered product is crushed by a jaw crusher or a stamp mill to form rough particles having less than 20 mesh under before the pulverization, the efficiency of the pulverization is superior. The pulverized particles are further ground preferably by a wet method, for example, by a wet atomizer at a concentration of the slurry of less than about 50% for 10 to 100 hours. Thus, the powder having an average particle diameter of 0.2 to 0.8μ is obtained. The powder is dried at lower than 100° C. to reduce a water content to less than 0.7%. The powder is pulverized into primary particles to obtain the ferrite powder of the present invention.

It has been confirmed that the resulting ferrite powder has spinel structure by X-ray diffraction. As a result of the chemical analysis, it has been confirmed that a part of iron component is in a form of divalent and the deviation from the stoichiometric structure is remarkably small. The ferrite powder has remarkably excellent characteristics as the magnetic powder for magnetic toner.

The ferrite powder type magnetic toner of the present invention can be prepared by combining the ferrite powder with a resinous component which is used in the conventional preparations of magnetic toners.

There are many descriptions on the preparation of the magnetic toner. Thus, these descriptions are not repeated, here.

The present invention will be further illustrated by certain examples and references which are provided for purposes of illustration only and are not intended to be limiting the present invention.

EXAMPLE 1

In a wet ball mill, $Mn_3O_4$ at a ratio of 27.5 mole % as MnO, and 12.5 mole % of CoO and 60 mole % of $Fe_2O_3$ were mixed for 5 hours. The resulting slurry was spray-dried to form granules which pass through a 20 mesh sieve. The granules were sintered in a furnace by heating it at a heating velocity of 200° C./hr. and sintering it at 1350° C. for 3 hours and cooling it at a cooling velocity of 300° C./hour. The oxygen partial pressure of the atmosphere was adjusted to give 21 vol.% during the heating to 900° C.; 5 vol.% during the heating from 900° to 1350° C.; 1.5 vol.% during the sintering at 1350° C.; 0.3 vol.% during the cooling from 1350° to 1100° C. and 0.01 vol.% during the cooling from 1100° to 150° C. as oxygen content. The sintered product was cooled to room temperature and discharged from the furnace. The sintered product was crushed by a stamp mill for 0.5 hour to pass through a 20 mesh sieve. The crushed sintered product was further pulverized by an atomizer to form particles passing through a 150 mesh sieve and then, 40 wt.% of a slurry of the pulverized product was further ground by a wet atomizer for 40 minutes. The powder obtained by grinding the slurry was dried at 90° C. for 24 hours and further pulverized by a atomizer to obtain a ferrite powder A. The resulting ferrite powder had an average particle diameter of 0.55μ and a specific surface area of 12.8 $m^2/g$. The particle size distribution was remarkably sharp. The magnetic characteristics of the ferrite powder were measured in an external magnetic field of 1000 Oe. As a result, σm was 65 emu/g. and Hc qA 1850.

EXAMPLE 2

In accordance with the process of Example 1 except using 80 mole % of $Fe_2O_3$ and 20 mole % of ZnO as starting materials, the components were mixed, granuled and sintered to obtain a ssintered product. The sintered product was pulverized by an atomizer to particle sizes of less than 10μ and then further ground by a wet atomizer in a form of 50 wt.% of a slurry for 48 hours. The slurry was dehydrated and dried at 90° C. for 48 hours and further pulverized by an atomizer to obtain a ferrite powder B. The resulting ferrite powder B had an average particle diameter of 0.45μ and a specific surface area of 17.2 $m^2/g$. The particle size distribution was remarkably sharp. In an external magnetic field of 1000 Oe, σm was 65 emu/g. and Hc was 1850 Oe.

EXAMPLE 3

In accordance with the process of Example 2 except using 6 mole % of CoO, 14 mole % of ZnO and 80 mole % of $Fe_2O_3$, as starting materials a ferrite powder C was obtained. The ferrite powder C had an average particle diameter of 0.45μ and a specific surface area of 17.8 $m^2/g$. The particle size distribution was remarkably sharp. In an external magnetic field of 1000 Oe, σm was 62 emu/g. and Hc was 310 Oe.

EXAMPLE 4

In accordance with the process of Example 2 except using 3 mole % of CoO, 17 mole % of ZnO and 80 mole % of $Fe_2O_3$, as starting materials a ferrite powder D was obtained. The ferrite powder D had an average particle diameter of 0.46μ and a specific surface area of 16.5 $m^2/g$. The particle size distribution was remarkably sharp. In an external magnetic field of 1000 Oe, σ m was 62 emu/g. and Hc was 220 Oe.

EXAMPLE 5

In accordance with the process of Example 2 except using 10 mole % of CoO, 10 mole % of ZnO and 80 mole % of $Fe_2O_3$, as starting materials a ferrite powder E was obtained. The ferrite powder E had an average particle diameter of 0.42μ and a specific surface area of 18.8 $m^2/g$. The particle size distribution was remarkably sharp. In an external magnetic field of 1000 Oe, σ m was 50 emu/g. and Hc was 360 Oe.

EXAMPLE 6

In accordance with the process of Example 1 except using 20 mole % of NiO and 80 mole % of $Fe_2O_3$, as starting materials and sintering the granulated components under maintaining the partial pressure of oxygen to less an 0.1 vol. % during the heating and cooling steps, the components were mixed, granulated, sintered, and pulverized to obtain a ferrite powder F. The ferrite powder F had an average particle diameter of 0.54μ and a specific surface area of 11.9 $m^2/g$. In an external magnetic field of 1000 Oe, σ m was 50 emu/g. and Hc was 220 Oe.

EXAMPLE 7

In accordance with the process of Example 1 except using 20 mole % of MnO, and 80 mole % of $Fe_2O_3$, as starting materials and sintering it at 1320° C. under a partial pressure of oxygen of less than 3 vol. % and cooling it under a partial pressure of oxygen of less than 0.1 vol. % and grinding the sintered product by the wet atomizer for 24 hours, a ferrite powder G was obtained. The ferrite powder G had an average particle diameter of 0.53μ and a specific surface area of 13.2 $m^2/g$. The particle size distribution was remarkably sharp. In an external magnetic field of 1000 Oe, σ m was 60 emu/g. and Hc was 150 Oe.

EXAMPLE 8

In accordance with the process of Example 7 except using 30 mole % of MnO, 10 mole % of ZnO and 60 mole % of $Fe_2O_3$ as starting materials, a ferrite powder H was obtained. The ferrite powder H had an average particle diameter of 0.54μ and a specific surface area of 12.3 $m^2/g$. The particle size distribution was remarkably sharp. In an external magnetic field of 1000 Oe, σ m was 62 emu/g. and Hc was 1480 Oe.

EXAMPLE 9

In accordance with the process of Example 7 except using 25 mole % of MnO, 15 mole % of ZnO and 60 mole % of $Fe_2O_3$, as starting materials and sintering the mixture at 1350° C. for 3 hours and grinding the sintered product by the wet atomizer for 40 hours, a ferrite powder I was obtained. The ferrite powder I had an average particle diameter of 0.47μ and a specific surface area of 16.2 $m^2/g$. The particle size distribution was remarkably sharp. In an external magnetic field of 1000 Oe, σ m was 55 emu/g. and Hc was 136 Oe.

EXAMPLE 10

In accordance with the process of Example 9 except using 15 mole % of NiO, 5 mole % of ZnO and 80 mole % of $Fe_2O_3$, as starting materials and grinding the sintered product by the atomizer for 48 hours, a ferrite powder J was obtained. The ferrite powder J had an average particle diameter of 0.42μ and a specific surface area of 19.9 $m^2/g$. The particle size distribution was remarkably sharp. In an external magnetic field of 1000 Oe, σ m was 53 emu/g. and Hc was 200 emu/g.

EXAMPLE 11

In accordance with the process of Example 10 except using 10 mole % of NiO, 6 mole % of CoO, 4 mole % of ZnO and 80 mole % of $Fe_2O_3$, as starting materials, and cooling the sintered product under a partial pressure of oxygen of less than 0.5 mole %, a ferrite powder K was obtained. The ferrite powder K had an average particle diameter of 0.44μ and a specific surface area of 18.3 $m^2/g$. The particle size distribution was remarkably sharp. In an external magnetic field of 1000 Oe, σ m was 56 emu/g. and Hc was 300 Oe.

EXAMPLE 12

In accordance with the process of Example 10 except using 10 mole % of NiO, 10 mole % of CoO and 80 mole % of $Fe_2O_3$, as starting materials and cooling the sintered product under a partial pressure of oxygen of less than 0.05 mole %, and grinding the sintered product by the wet atomizer for 24 hours, a ferrite powder L was obtained. The ferrite powder L had an average particle diameter of 0.53μ and a specific surface area of 12.2 $m^2/g$. The particle size distribution was remarkably sharp.

In an external magnetic field of 1000 Oe, σ m was 44 emu/g. and Hc was 430 Oe.

Various tests were carried out for the studies of effects of the ferrite powder of the present invention. Certain results will be shown.

EXPERIMENTS

A magnetite A was produced by a conventional aqueous solution method as follow.

1 Kg. of $FeSO_3.7H_2O$ was dissolved in a deionized water and the solution was charged in a sealed constant temperature reactor. An oxidation was prevented by purging air in the reactor with nitrogen gas. The bath was heated to 60° C. and, 6 N-NaOH was added to the solution so as to neutralize it. Ferrous hydroxide was obtained by the neutralization and then, air was fed at a rate of 10 liter per minute for 24 hours to result a spinel type product and then, the product was dried at 80° C. for 48 hours to obtain the magnetite powder A. The resulting magnetite powder A had an average diameter of 0.2μ and a specific surface area of 28 $m^2/g$. The particle size distribution was broader in comparison with those of the ferrite powders A to L.

In an external magnetic field of 1000 Oe, σ m was 55 emu/g. and Hc was 80 Oe.

On the other hand, the commercially available magnetite powder prepared by the other aqueous solution method, EPT-1000 (average particle diameter of 0.7μ and a specific surface area of 4.2 $m^2/g$) and MTA-650 (average particle diameter of 0.5μ and a specific surface area of 19.9 $m^2/g$) manufactured by Toda Kogyo, K.K. were used as a magnetite B and a magnetite C.

In an external magnetic field of 1000 Oe, the magnetite B had σ m of 65 emu/g. and Hc of 90 Oe and the magnetite C had σ m of 58 emu/g. and Hc of 260 Oe.

Various characteristics of the magnetites A to C and, the ferrites A to L of the present invention were measured.

In Table 1, electric characteristics and magnetic characteristics and hues of the ferrites A to F and the magnetites A to C were shown.

On the other hand, heat resistances were tested by measuring deterioration of the magnetic characteristics and the hues.

With regard to the deterioration of magnetic characteristics each sample was kept at 80° C. for 1 hour and 120° C. for 1 hour and then each deterioration of each maximum magnetizing force σ m in an external magnetic field of 5000 Oe was measured and shown by percent in Table 2.

With regard to the deterioration of hue, each sample was kept at 150° C. for 1 hour and then, each deterioration of a difference between reflectivities at 630 mμ and 450 mμ and shown by percent in Table 2.

Each sample was kept in $10^{-3}$ torr for 2 hours and exposed in an atmosphere having a relative humidity of 75% and each periodical variation of adsorbed water was measured to evaluate the water resistance. The amounts of water absorbed in each sample after 10 hours or 70 hours are shown in Table 2. Each sample was dipped in a deionized water at a ratio of 100 g./liter and the mixture was stirred and kept in stand still and pH of the supernatant was measured and the residual alkaline material which causes adverse effect to a resin was evaluated. The results are also shown in Table 2.

According to the results shown in Tables 1 and 2, it is understood that the ferrites A to F of the present invention had superior characteristics to the conventional magnetites A to C. The ferrites A to F of the present invention had remarkably superior characteristics in total.

The ferrites G to L had substantially same characteristics as those of the ferrites A to F.

TABLE 1

| | Ferrite | | | | | |
|---|---|---|---|---|---|---|
| | A | B | C | D | E | F |
| Average particle diameter (μ) | 0.55 | 0.45 | 0.45 | 0.46 | 0.43 | 0.54 |
| Specific surface area ($m^2$/g.) | 12.8 | 17.2 | 17.8 | 16.5 | 18.8 | 11.9 |
| Maximum magnetizing force σm in 1000 Oe (emu/g.) | 45 | 65 | 62 | 62 | 50 | 50 |
| Coercieve force Hc in 1000 Oe (Oe) | 415 | 185 | 310 | 220 | 360 | 220 |
| B-H product σm × Hc (×$10^4$) | 1.79 | 1.20 | 2.08 | 1.36 | 1.80 | 1.10 |
| Electric resistivity (Ω, cm) | $10^7$ | $10^5$ | $10^6$ | $10^6$ | $10^6$ | $10^7$ |
| Hue *1 | RB | BB | BB | BB | BB | BB |

| | Magnetite | | |
|---|---|---|---|
| | A | B | C |
| Average particle diameter (μ) | 0.2 | 0.7 | 0.5 |
| Specific surface area ($m^2$/g.) | 28 | 4.5 | 19.9 |
| Maximum magnetizing force σm in 1000 Oe (emu/g.) | 55 | 65 | 58 |
| Coercieve force Hc in 1000 Oe (Oe) | 80 | 90 | 260 |
| B-H product σm × Hc (×$10^4$) | 0.44 | 0.57 | 1.51 |
| Electric resistivity (Ω, cm) | $10^7$ | $10^6$ | $10^7$ |
| Hue *1 | BB | B | BB |

Note *1:
RB: reddish black
BB: blackish brown
B: black

TABLE 2

| | Ferrite | | | | | | Magnetite | | |
|---|---|---|---|---|---|---|---|---|---|
| | A | B | C | D | E | F | A | B | C |
| Heat resistance Deterioration of σm (%) | | | | | | | | | |
| 80° C. | 0.9 | 1.2 | 1.1 | 1.3 | 0.7 | 0.7 | 2.2 | 1.8 | 3.4 |
| 120° C. | 2.0 | 2.8 | 2.2 | 3.0 | 1.4 | 1.2 | 6.5 | 3.9 | 12.4 |
| Deterioration of hue (%) | | | | | | | | | |
| 150° C. | 0.0 | 0.1 | 0.1 | 0.1 | 0.1 | 0.0 | 1.8 | 1.2 | 4.5 |
| Water absorption (× $10^{-4}$g/$m^2$) | | | | | | | | | |
| after 10 hours | 1.6 | 1.7 | 1.6 | 1.5 | 1.7 | 1.7 | 1.8 | 2.4 | 1.0 |
| after 70 hours | 2.2 | 2.4 | 2.3 | 2.0 | 2.6 | 2.5 | 2.8 | 2.9 | 3.3 |
| Residual alkaline material pH | 6.9 | 7.0 | 6.9 | 7.0 | 6.9 | 7.0 | 8.7 | 9.2 | 7.7 |

The ferrite powders of the present invention and preparations thereof have been described in details.

The applications of the ferrite powders of the present invention for magnetic toners will be further illustrated.

Magnetic toners are prepared by blending the ferrite powder of the present invention to a resinous component which can be selected from various thermoplastic resins.

Suitable thermoplastic resins include homopolymers or copolymers derived from one or more monomer such as styrenes, vinylnaphthalene, vinylesters, α-methylene aliphatic monocarboxylic acid esters, acrylonitrile, methacrylonitrile, acrylamide, vinyl ethers, vinyl ketones and N-vinyl compounds or mixtures thereof.

The known resinous components for a magnetic toner can be effectively used. It is preferable to use a resinous component having a glass transition point of about several tens °C., and an average weight molecular weight of about $10^3$ to $10^5$.

In a magnetic toner, it is preferable to incorporate 0.2 to 0.7 wt. part of the ferrite powder of the present invention in 1 wt. part of the resinous component.

In the preparation of the toner, in accordance with the conventional process, the ferrite powder and the resinous component are mixed in a ball mill and the mixture is kneaded by a hot roll and cooled and pulverized and if necessary, the pulverized product is seived. Thus, a magnetic toner having an average particle diameter of about 5 to 40μ is obtained.

If necessary, a coloring agent such as a pigment and a dye or a charge modifier etc. can be incorporated in the magnetic toner. The magnetic toner can be used for forming an image by a conventional process and a conventional apparatus.

Various tests of magnetic toners prepared by using the ferrite powders of the present invention were carried out to find superiority of these magnetic toners. One example will be described.

Test 2, 3 Weight parts of styrene resin and 1 wt. part of modified maleic acid resin and each of the ferrite powders A to L of the present invention were mixed by a ball mill and kneaded, cooled, pulverized, dried and sieved to prepare twelve kinds of toners having an average particle diameter of 15μ.

An electrostatic image was formed on a selenium photosensitive drum and developed by using the resulting toner by the conventional magnetic brush process. The developed image was transferred on a paper and fixed. Excellent results were obtained by using each of the toners. Excellent images were reproduced by repeating the development and the transferring. When the selenium photosensitive drum was replaced to a zinc oxide photosensitive drum, excellent image was also obtained.

What is claimed is:

1. A one-component ferrite powder type magnetic toner for use in electrophotography comprising toner particles having an average particle diameter of 5 to 40μ, wherein each of said toner particles comprises a resinous component suitable for electrophotographic development and ferrite powder particles therein, the particles of the ferrite powder having an average particle diameter of 0.2 to 0.8μ, the ferrite having a spinel structure comprising components of iron oxide at a ratio of 99.9 to 51 mole % as $Fe_2O_3$ and at least one metal oxide selected from the group consisting of manganese oxide, nickel oxide, cobalt oxide, magnesium oxide, copper oxide, zinc oxide and cadmium oxide at a ratio of 0.1 to 49 mole % as MO wherein M represents Mn, Ni, Co, Mg, Cu, Zn or Cd, and wherein said ferrite powder is incorporated at a ratio of 0.2 to 0.7 wt. parts to 1 wt. part of said resinous component in said toner particles.

2. A ferrite powder type magnetic toner according to claim 1 wherein the ferrite powder comprises a component selected from the group consisting of $$(M^{(1)}O)_a(Fe_2O_3)_{1-a} \quad \text{I}$$

wherein $M^{(1)}$ represents Mn, Zn, Ni, Co or Mg and a is in a range of 0.01 to 0.4;

$$(M^{(2)}O)_b(ZnO)_c(Fe_2O_3)_{1-b-c} \quad \text{II}$$

wherein $M^{(2)}$ represents Mn, Ni, Co or Mg and b+c is in a range of 0.01 to 0.45;

$$(M^{(3)}O)_d(CoO)_e(Fe_2O_3)_{1-d-c} \quad \text{III}$$

wherein $M^{(3)}$ represents Mn, Ni or Mg and d+e is in a range of 0.01 to 0.45; and $$(M^{(4)}O)_f(CoO)_g(ZnO)_n(Fe_2O_3)_{1-f-g-h} \quad \text{IV}$$

wherein $M^{(4)}$ represents Mn, Ni or Mg and f+g+h is in a range of 0.01 to 0.45.

3. A ferrite powder type magnetic toner according to claim 1 wherein said resinous component has a weight average molecular weight of $10^3$ to $10^5$.

4. A ferrite powder type magnetic toner according to claim 1 wherein said resinous component is a homopolymer or copolymer of one or more monomers of styrenes vinylnaphthalene, vinyl esters, α-methylene aliphatic monocarboxylic acid esters, acrylonitrile, methacrylonitrile, acrylamide, vinyl ethers, vinyl ketones and N-vinyl compounds.

5. A ferrite powder type magnetic toner according to claim 4, wherein said resinous component has a weight average molecular weight of $10^3$ to $10^5$.

6. A ferrite powder type magnetic toner according to claim 1 wherein the ferrite powder particles;

(a) are capable of acquiring a maximum magnetization, σm, of higher than 40 emu/g. in an external magnetic field of about 1000 Oe, (b) require a coercive force Hc of about 150 to 500 Oe in an external magnetic filed of 100 Oe, and (c) possess an electrical resistivity of $10^2$ to $10^7$ Ω.cm.

7. A process for producing a ferrite powder having a spinel structure used for magnetic toner which comprises wet mixing iron or iron oxide at a ratio of 99.9 to 51 mole % as $Fe_2O_3$ with at least one metal compound selected from the group consisting of oxides of manganese, nickel, cobalt, magnesium, copper, zinc and cadmium and compounds which are convertible to the metal oxide by heating, at a ratio of 0.1 to 49 mole % as MO wherein M represents Mn, Ni, Co, Mg, Cu, Zn or Cd, and granulating the mixture to form granules passing a 20 to 30 mesh sieve and sintering the granulated mixture at higher than 1000° C. in an atmosphere in which partial pressure of oxygen is controlled to be less than 5 vol % when the temperature reaches 800° to 900° C. and to decrease to less than 0.5% at the start of cooling; and mechanically pulverizing the sintered product to obtain a ferrite powder having an average particle diameter of 0.2 to 0.8μ.

* * * * *

UNITED STATES PATENT AND TRADEMARK OFFICE

CERTIFICATE OF CORRECTION

PATENT NO. : 4,282,302

DATED : August 4, 1981

INVENTOR(S) : MOTOHIKO MAKINO ET AL

It is certified that error appears in the above-identified patent and that said Letters Patent are hereby corrected as shown below:

Column 13, line 20, in formula III, delete the last subscript "c" and insert therefor: --e--.

Column 13, line 25, in formula IV, delete the subscript "n" to "(ZnO)" and insert therefor: --h--.

Signed and Sealed this

*Thirteenth* Day of *April 1982*

[SEAL]

*Attest:*

GERALD J. MOSSINGHOFF

*Attesting Officer* *Commissioner of Patents and Trademarks*